US010685108B2

(12) United States Patent
Martinez et al.

(10) Patent No.: US 10,685,108 B2
(45) Date of Patent: Jun. 16, 2020

(54) SYSTEM AND METHOD OF DETERMINING ONE OR MORE INCONSISTENCIES IN OPERATING INFORMATION HANDLING SYSTEMS

(71) Applicant: Dell Products L.P., Round Rock, TX (US)

(72) Inventors: Ricardo L. Martinez, Leander, TX (US); Richard M. Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 15/971,080

(22) Filed: May 4, 2018

(65) Prior Publication Data
US 2019/0340055 A1 Nov. 7, 2019

(51) Int. Cl.
| G06F 11/00 | (2006.01) |
| G06F 21/55 | (2013.01) |
| G06F 13/40 | (2006.01) |
| G06F 21/75 | (2013.01) |
| G06F 21/81 | (2013.01) |
| G06F 11/30 | (2006.01) |

(52) U.S. Cl.
CPC ........ G06F 21/554 (2013.01); G06F 11/3041 (2013.01); G06F 11/3089 (2013.01); G06F 13/4068 (2013.01); G06F 21/55 (2013.01); G06F 21/755 (2017.08); G06F 21/81 (2013.01)

(58) Field of Classification Search
CPC .............. G06F 11/006; G06F 11/0727; G06F 11/0793; G06F 11/0754; G06F 13/4068; G06F 13/4086; G06F 21/55; G06F 21/554; G06F 21/575; G06F 21/75; G06F 21/755; G06F 21/81; G06F 21/86
See application file for complete search history.

(56) References Cited

U.S. PATENT DOCUMENTS

| 7,945,792 B2 * | 5/2011 | Cherpantier ............ G06F 21/86 365/145 |
| 8,836,509 B2 * | 9/2014 | Lowy ...................... G06F 21/86 257/678 |
| 8,896,455 B2 * | 11/2014 | Eguro ..................... G06F 21/86 324/649 |
| 10,243,747 B2 * | 3/2019 | Ramalingam ......... H04L 9/3247 |

(Continued)

OTHER PUBLICATIONS

Kallenberg, Corey et al. "All Your Boot Arc Belong to Us." CanSeeWest 2014; 38 pages., 2014.

(Continued)

Primary Examiner — Marc Duncan
(74) Attorney, Agent, or Firm — Baker Botts L.L.P.

(57) ABSTRACT

In one or more embodiments, one or more systems, methods, and/or processes may obtain first multiple samples of a signal conveyed via a coupling of a memory medium of an information handling system; may convert the first multiple samples to respective first multiple digital values; may determine an impedance based at least on the first multiple digital values; may compare the impedance with a baseline impedance; may determine an inconsistency based at least on comparing the impedance with the baseline impedance of the coupling of the memory medium; and may, in response to determining the inconsistency, shut down the information handling system.

20 Claims, 12 Drawing Sheets

(56) References Cited

U.S. PATENT DOCUMENTS

2016/0308889 A1* 10/2016 Justin ................. H04L 63/1416
2017/0024585 A1* 1/2017 Mooij ..................... G06F 21/72
2019/0028283 A1* 1/2019 Sharifi ............... G06Q 20/3823

OTHER PUBLICATIONS

Dediprog, "SPI Flash Programming Solution: SF100 ISP IC Programmer." Retrieved from url: https://www.dediprog.com/pd/spi-flash-solution/sf100, May 3, 2018; 2 pages., May 3, 2018.
Dediprog, "Programmer accessories: SF100 ISP Testclip (SO8)." Retrieved from url: https://www.dediprog.com/pd/programmer-accessories/ISP-TC-8, May 3, 2018; 2 pages., May 3, 2018.
Kovah, Xeno et al. "Are you giving firmware attackers a free pass?" RSA Conference Apr. 20-24, 2015; 51 pages.; Apr. 2015.
Kallenberg, Corey et al. "Extreme Privilege Escalation on Windows 8/UEFI Systems." MITRE 2014; 58 pages., 2014.
DediProg, "DediProg SF Software User Manual." Version 7.6, Jan. 2018; 45 pages., Jan. 2018.
Wojtczuk, Rafal et al. "Attacks on UEFI Security.", 2014.
Hendrick, Tom. "Interfacing the TLC3544/48 ADC to the MSP430F149." Texas Instruments Application Report, SLAA126A, Jul. 2002; 14 pages., Apr. 2002.
Maxim Integrated Products, "Low-Voltage, Quad, SPDT, CMOS Analog Switch." MAX394, Rev 2; Sep. 2008, www.maxim-ic.com; 13 pages., Sep. 2008.
Microcontroller Division Applications, "Understanding and Minimising ADC Conversion Errors." ST, AN1636 Application Note, 2003; 42 pages., 2003.
Kester, Walt. "The Data Conversion Handbook." Newnes, 2005, ISBN 0-7506-7841-0; 100 pages., 2005.

* cited by examiner

SYSTEM AND METHOD OF DETERMINING ONE OR MORE INCONSISTENCIES IN OPERATING INFORMATION HANDLING SYSTEMS

BACKGROUND

Field of the Disclosure

This disclosure relates generally to information handling systems and more particularly to determining one or more inconsistencies in operating information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may obtain first multiple samples of a signal conveyed via a coupling of a memory medium of an information handling system; may convert the first multiple samples to respective first multiple digital values; may determine an impedance based at least on the first multiple digital values; may compare the impedance with a baseline impedance of the coupling of the memory medium; may determine an inconsistency based at least on comparing the impedance with the baseline impedance; and may, in response to determining the inconsistency, shut down the information handling system. In one or more embodiments, the first multiple samples may include multiple voltage samples. In one or more embodiments, the first multiple samples may include multiple current samples. In one or more embodiments, the one or more systems, methods, and/or processes may further establish the baseline impedance of the coupling of the memory medium. For example, establishing the baseline impedance of the coupling may include obtaining second multiple samples of a second signal conveyed via the coupling, converting the second multiple samples to respective second multiple digital values, and determining the baseline impedance based at least on the second multiple digital values. For instance, the second multiple digital values may be obtained before the first multiple digital values. In one or more embodiments, the impedance of the coupling of the memory medium may include a first reactive impedance, and the baseline impedance of the coupling of the memory medium may include a second reactive impedance. For example, determining the inconsistency may include determining that the first reactive impedance does not match the second reactive impedance. In one or more embodiments, the one or more systems, methods, and/or processes may further, in response to determining the inconsistency, ground the coupling of the memory medium.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
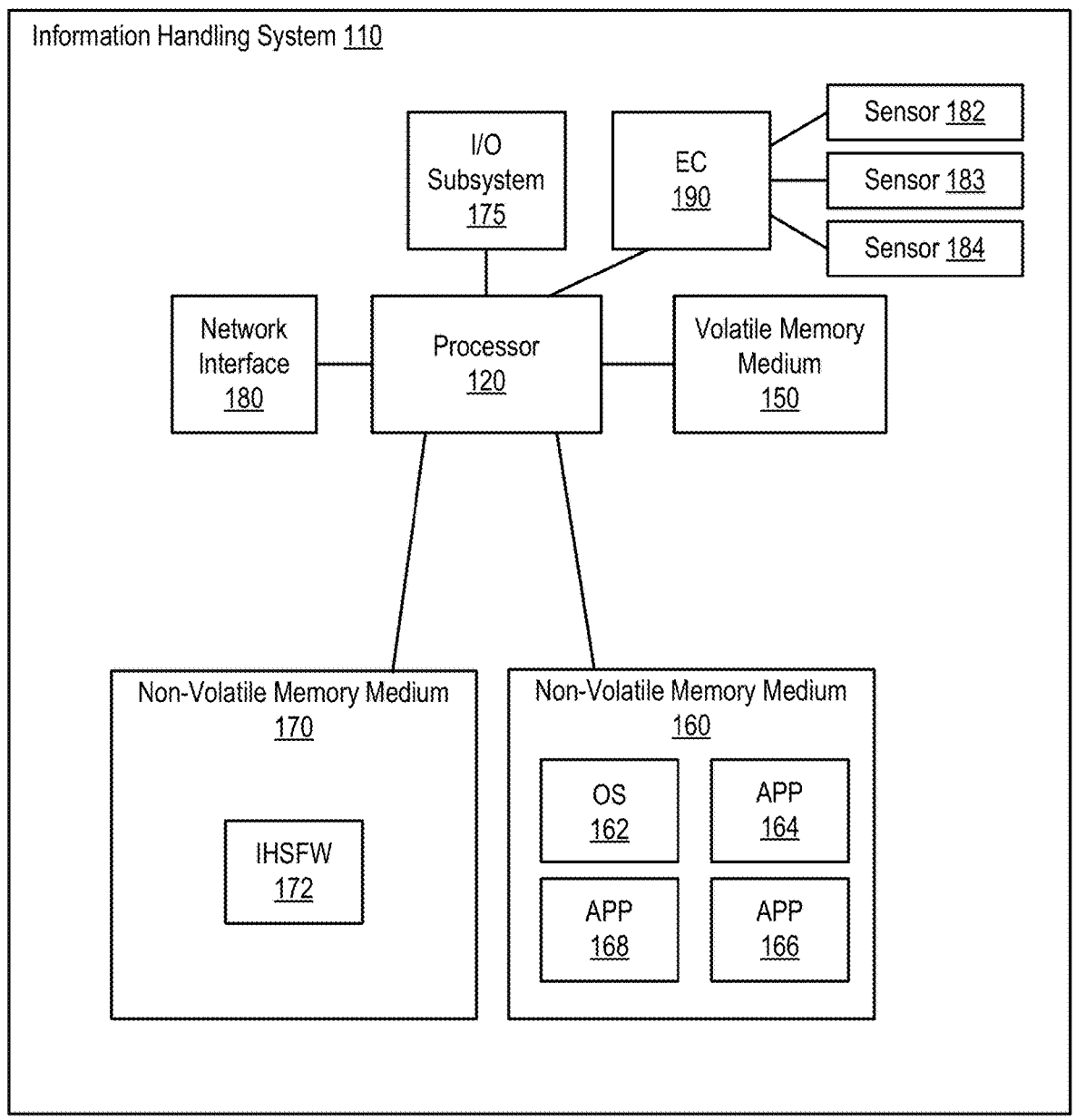
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may be designed and/or configured to protect the information handling system the system and/or one or more of its users from one or more people that may have direct physical access to the information handling system. For example, the information handling system may be designed and/or configured to protect information handling system firmware and/or other data stored by the information handling system. For instance, the information handling system may rely on non-volatile storage (e.g., flash memory, non-volatile random access memory, etc.) to store information (e.g., information handling system firmware, sensitive information such as one or more passwords, one or more encryption keys, one or more secure boot certificates, one or more roots of trust, etc.).

In one or more embodiments, the information handling system may be designed and/or configured to protect the non-volatile storage from attacks from one or more networks. In one or more embodiments, the information handling system may be designed and/or configured to protect the non-volatile storage from attacks from direct physical access to one or more components of the information handling system. For example, the information handling system may be designed and/or configured to protect the non-volatile storage from attacks from direct physical access to pins and/or couplings of the non-volatile storage.

As one example, a user of the information handling system may leave the information handling system in a hotel room of a hotel, and one or more personnel of the hotel may have physical access to the information handling system and/or one or more components of the information handling system while the user is away from the hotel room. As another example, a user of the information handling system may provide the information handling system to a customs officer upon entering a country. For instance, the information handling system may not be visible for a period of time while one or more customs officers inspect the information handling system. In these examples, the information handling system may protect the non-volatile storage from a person having direct access to pins and/or couplings of the non-volatile storage. For instance, the information handling system may protect the non-volatile storage from a person that may attempt to extract one or more trade secrets, to extract sensitive information, and/or to modify the information handling system firmware. In these examples, if the information handling system did not protect the non-volatile storage from a person having direct access to pins and/or couplings of the non-volatile storage, the person may extract and/or modify information stored via the non-volatile storage without evidence of tampering with the non-volatile storage and/or the information handling system.

In one or more embodiments, one or more pins and/or coupling of the non-volatile storage may be grounded. In one example, one or more pins and/or coupling of the non-volatile storage may be grounded while the information handling system is powered off. In a second example, one or more pins and/or coupling of the non-volatile storage may be grounded while the information handling system is in a low power state. In another example, one or more pins and/or coupling of the non-volatile storage may be grounded while the information handling system is a locked state. For instance, the locked state may include a screen lock of an operating system. In one or more embodiments, grounding one or more pins and/or coupling of the non-volatile storage may include engaging one or more switches. For example, the one or more switches may be coupled to a ground. In one or more embodiments, a switch may be or include one or more transistors. In one example, a transistor may include a bipolar junction transistor (BJT), a junction gate field-effect transistor (JFET), or a metal-oxide-semiconductor field-effect transistor (MOSFET), among others. In a second example, a switch may be or include a logic gate. In a third example, a switch may be or include a mechanical switch. In another example, a switch may be or include a multiplexed (MUXed) switch. For instance, a multiplexer (MUX) may pull one or more of the pins and/or coupling of the non-volatile storage to ground.

In one or more embodiments, a component of the information handling system may monitor and/or control power rails of the information handling system. For example, the component that may monitor and/or control power rails of the information handling system may be or include an embedded controller of the information handling system. In one instance, the embedded controller may monitor one or more impedances (e.g., one or more real impedances and/or one or more reactive impedances). In a second instance, the embedded controller may monitor one or more pins and/or couplings of the non-volatile storage (e.g., a chip select pin and/or coupling, a data pin and/or coupling, a clock pin and/or coupling, a power pin and/or coupling, etc.). In another instance, the embedded controller may electrically control the non-volatile storage via grounding one or more of the pins and/or couplings of the non-volatile storage to ground.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, sensors 182-184, and an embedded controller (EC) 190. As illustrated, volatile memory medium 150, non-volatile memory media 160 and 170, I/O subsystem 175, network interface 180, and EC 190 may be communicatively coupled to processor 120. As shown, sensors 182-184 may be coupled to EC 190. In one or more embodiments, one or more of sensors 182-184 may include one or more of a Hall effect sensor, an electronic magnetometer, a motion sensor, a proximity sensor, an electronic accelerometer, an electronic gyroscope, a camera, and an analog to digital converter, among other sensors. In one or more embodiments, EC 190 and/or one or more of sensors 182-184 may be coupled to one or more other components of IHS 110 and/or may be coupled to one more coupling of one or more other components of IHS 110.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, EC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

In one or more embodiments, processor 120 and one or more components of IHS 110 may be included in a system-on-chip (SoC). For example, the SoC may include processor 120 and a platform controller hub (not specifically illustrated).

Figure 2:
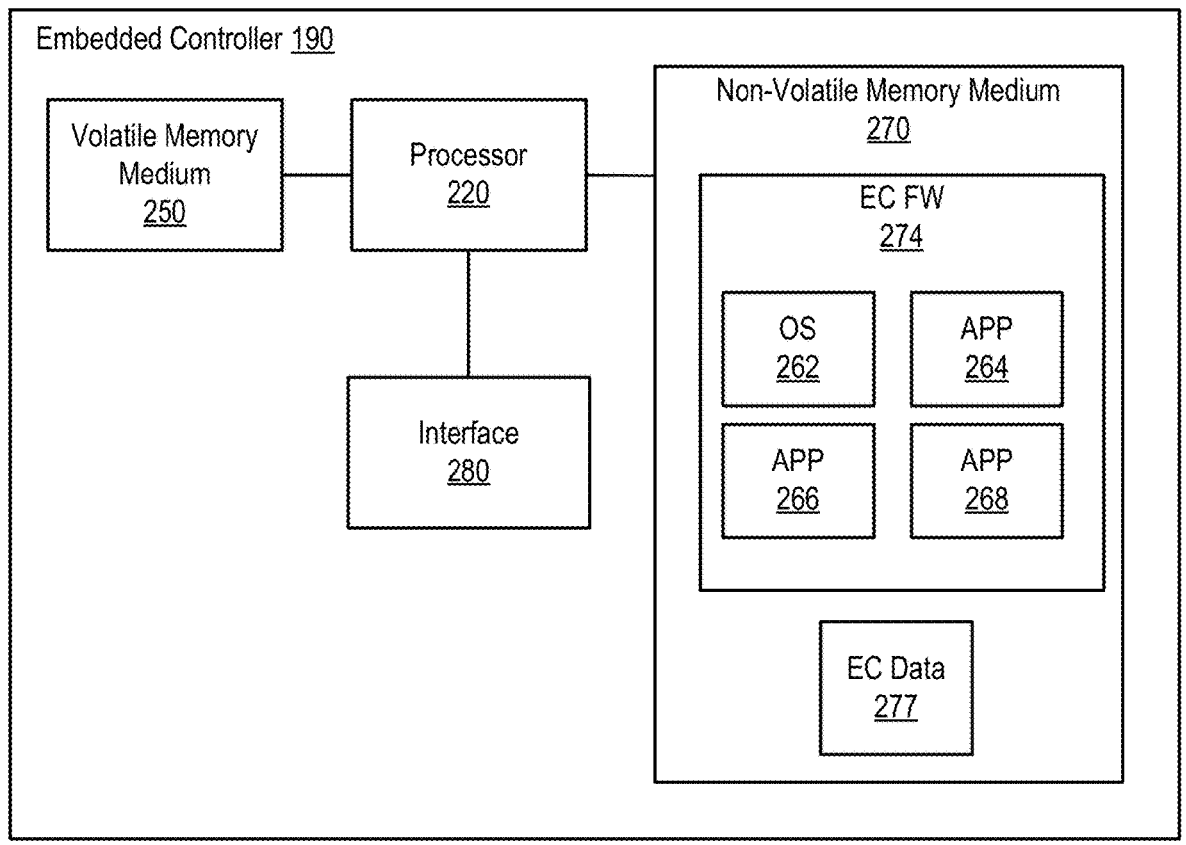
FIG. 2 illustrates an example embedded controller, according to one or more embodiments.

Turning now to FIG. 2, an example embedded controller is illustrated, according to one or more embodiments. As shown, EC 190 may include a processor 220, a volatile memory medium 250, a non-volatile memory medium 270, and an interface 280. As illustrated, non-volatile memory medium 274 may include an EC FW 274, which may include an OS 262 and APPs 264-268, and may include EC data 277. For example, OS 262 may be or include a real-time operating system (RTOS).

In one or more embodiments, interface 280 may include circuitry that enables communicatively coupling to one or more devices. In one example, interface 280 may include circuitry that enables communicatively coupling to one or more buses. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 190 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with one or more of systems, flowcharts, methods, and/or processes described herein. For example, non-volatile memory medium 270 and/or volatile memory medium 260 may store instructions that may be executable in accordance with one or more of systems, flowcharts, methods, and/or processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Figure 3A:
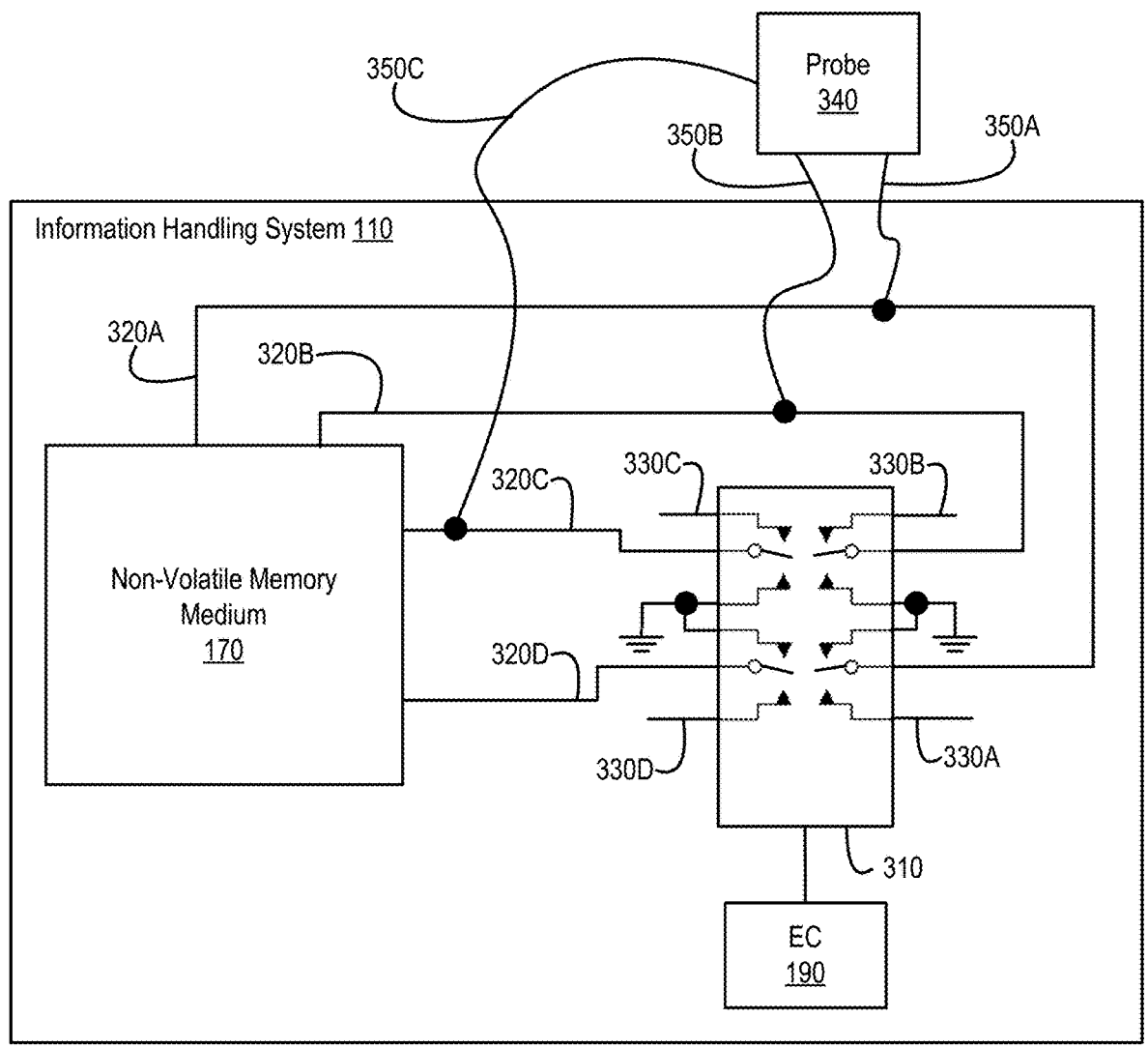
FIG. 3A illustrates a first example of a probe coupled to couplings of a component of an information handling system, according to one or more embodiments.
Figure 3A:
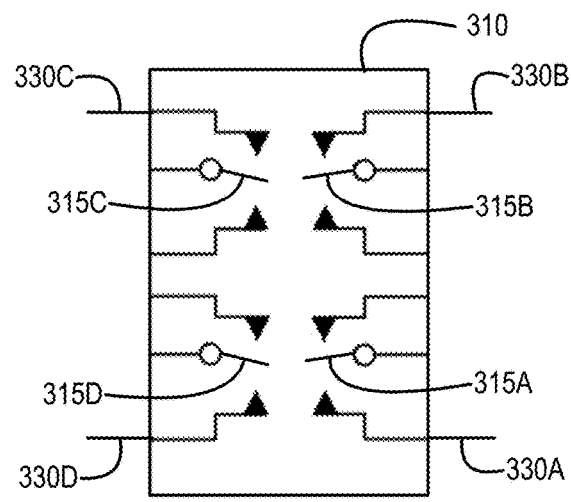

Turning now to FIG. 3A, a first example of a probe coupled to couplings of a component of an information handling system is illustrated, according to one or more embodiments. As shown, IHS 110 may include a switch 310. In one or more embodiments, switch 310 may include multiple switches. As illustrated, couplings 320A-320D may be coupled to switch 310. In one or more embodiments, a coupling 320 may be or include a printed circuit board (PCB) trace. In one or more embodiments, wipers 315A-315D may be controlled to switch couplings 320A-320D to couplings 330A-330D, respectively, or to ground. For example, couplings 330A-330D may be coupled to a component of IHS 110. For instance, couplings 330A-330D may be coupled to processor 120. In one or more embodiments, EC 190 may control wipers 315A-315D. As shown, EC 190 may be coupled to switch 310.

In one or more embodiments, wipers 315A-315D may not be physical wipers. For example, wipers 315A-315D may be for illustrative purposes, to show switching logic. For instance, wipers 315A-315D may implemented via semiconductors. In one or more embodiments, a switch of switch 310 may be or include one or more transistors. In one example, a transistor may include a BJT, a JFET, or a MOSFET, among others. In a second example, a switch may be or include a logic gate. In a third example, a switch may be or include a mechanical switch. In another example, a switch may be or include a MUXed switch. In one instance, a MUX may pull one or more of the pins and/or coupling of a memory medium to ground. In another instance, the MUX may couple the one or more of the pins and/or coupling of the memory medium to another component of IHS 110.

In one or more embodiments, a probe may be coupled to one or more couplings and/or pins of an information handling system. In one example, the probe may receive signals from the one or more couplings and/or pins of the information handling system. For instance, the probe may snoop and/or copy signals from the one or more couplings and/or pins of the information handling system. In another example, the probe may provide signals to the one or more couplings and/or pins of the information handling system. For instance, the probe may provide data to and/or provide processor instructions to the one or more couplings and/or pins of the information handling system. In one or more embodiments, a probe may be or include a programmer. In one example, the probe may configure one or more memory media. In one instance, the one or more memory media may include one or more non-volatile memory media. In another instance, the memory media may be or include one or more serial memory media. In a second example, the probe may configure one or more processing devices. In a third example, the probe may read configure information from one or more memory media. In one instance, the one or more memory media may include one or more non-volatile memory media. In another instance, the memory media may be or include one or more serial memory media. In another example, the probe may read configuration information from one or more processing devices.

As illustrated, probe 340 may be coupled to one or more couplings of non-volatile memory medium 170. As illustrated, probe 340 may be coupled to couplings 320A-320C of non-volatile memory medium 170 via couplings 350A-350C, respectively. In one or more embodiments, probe 340 may not configure non-volatile memory medium 170 when switch 310 grounds one or more of couplings 320A-320C. In one or more embodiments, probe 340 may not read information from non-volatile memory medium 170 when switch 310 grounds one or more of couplings 320A-320C.

Figure 3B:
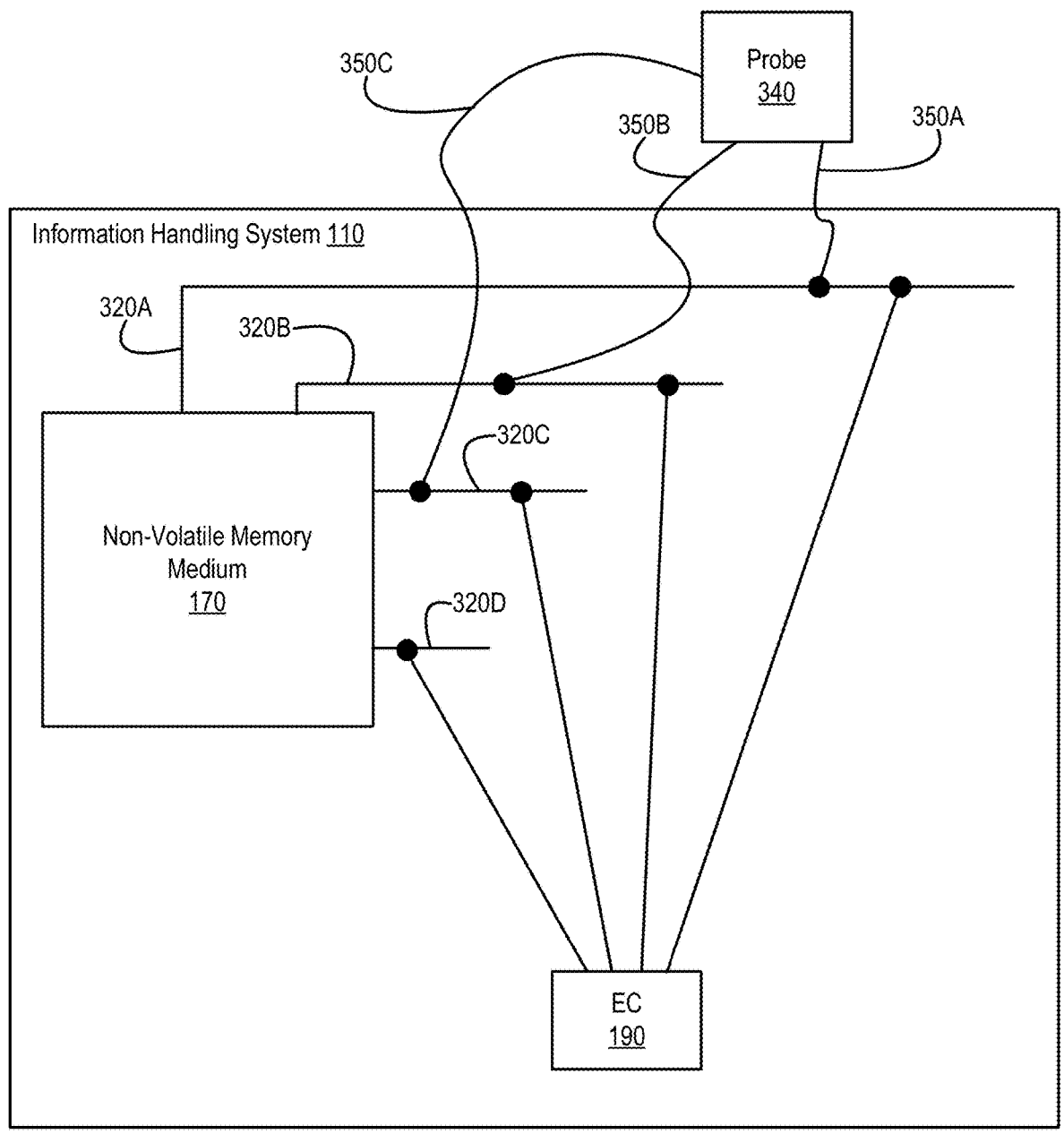
FIG. 3B illustrates a second example of a probe coupled to couplings of a component of an information handling system, according to one or more embodiments.

Turning now to FIG. 3B, a second example of a probe coupled to couplings of a component of an information handling system is illustrated, according to one or more embodiments. As illustrated, couplings 320A-320D may be coupled to EC 190. In one or more embodiments, EC 190 may ground one or more of couplings 320A-320D. In one or more embodiments, EC 310 may include one or more transistors that may ground one or more of couplings 320A-320D. For example, a transistor may include a BJT, a JFET, or a MOSFET, among others. In one or more embodiments, EC 190 may include one or more switches that may ground one or more of couplings 320A-320D. In one or more embodiments, a switch of EC 190 may be or include one or more transistors. In one example, a transistor may include a BJT, a JFET, or a MOSFET, among others. In a second example, a switch may be or include a logic gate. In a third example, a switch may be or include a mechanical switch. In another example, a switch may be or include a MUXed switch. In one instance, a MUX may pull one or more of the pins and/or coupling of a memory medium to ground. In another instance, the MUX may couple the one or more of the pins and/or coupling of the memory medium to another component of IHS 110. In one or more embodiments, EC 190 may include one or more structures and/or one or more functionalities as those described with reference to switch 310.

Figure 4A:
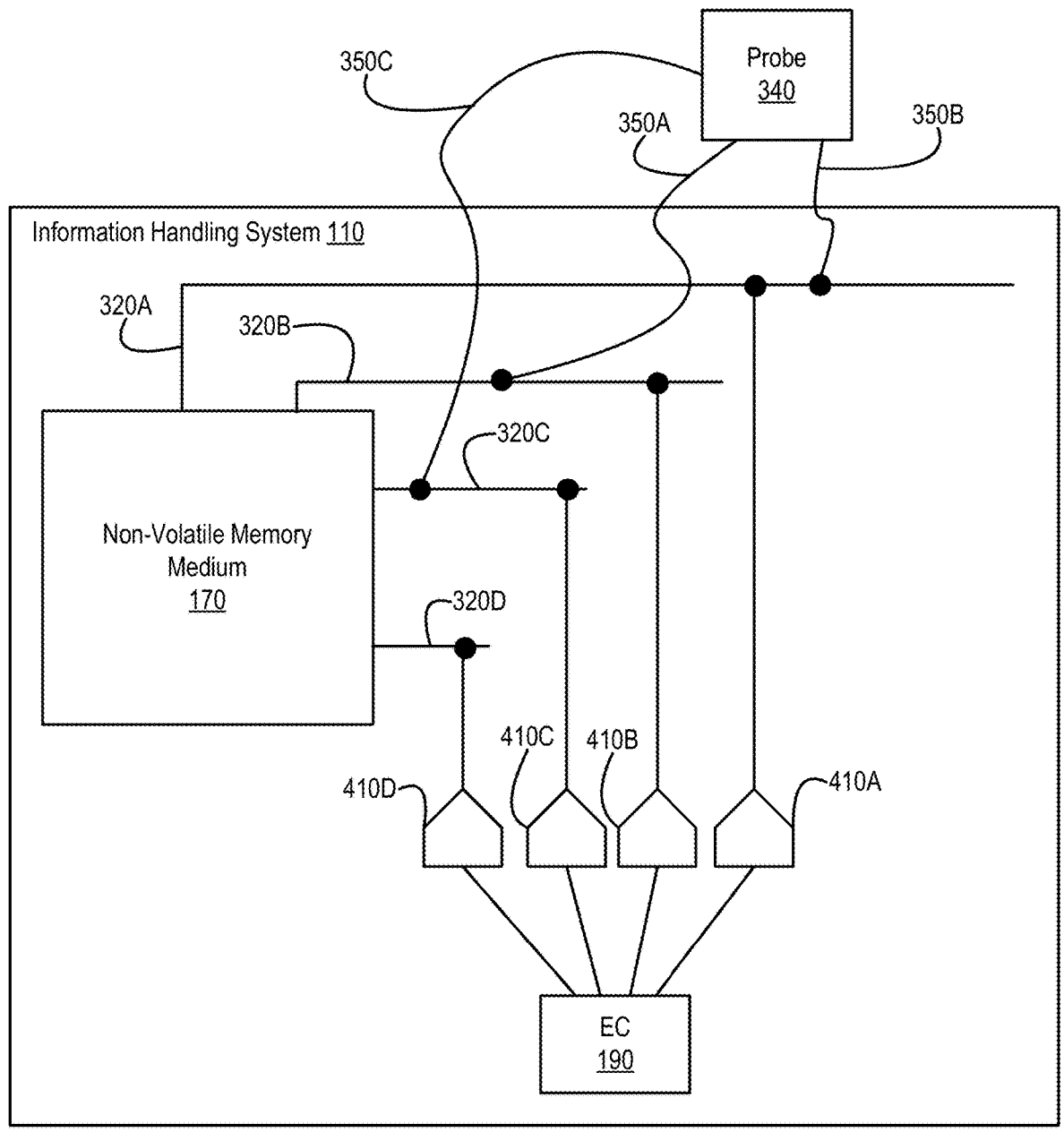
FIG. 4A illustrates a third example of a probe coupled to couplings of a component of an information handling system, according to one or more embodiments.

Turning now to FIG. 4A, a third example of a probe coupled to couplings of a component of an information handling system is illustrated, according to one or more embodiments. As shown, IHS 110 may include analog to digital converters (ADCs) 410A-410D. In one or more embodiments, an analog to digital converter (ADC) may be or include a device and/or a system that may transform an analog signal to a digital signal. For example, an ADC may transform an analog voltage or an analog current to a digital number. In one instance, the digital number may represent a magnitude of the analog voltage or the analog current. In another instance, the digital number may represent a direction (e.g., positive or negative) of the analog voltage or the analog current. In one or more embodiments, the digital number may or include data that that is proportional to the analog voltage or the analog current. For example, data that that is proportional to the analog voltage or the analog current may be or include a number that is proportional to the analog voltage or the analog current. For instance, the number that is proportional to the analog voltage or the analog current may be or include a two's complement binary number that is proportional to the analog voltage or the analog current.

As illustrated, EC 190 may be coupled to ADCs 410A-410D. For example, ADCs 410A-410D may be coupled to interface 280 of EC 190. In one or more embodiments, ADCs 410A-410D may provide information to EC 190. For example, ADCs 410A-410D may provide, to EC 190, information associated with one or more signals associated with one or more of couplings 320A-320D, respectively. In one instance, an ADC 410 may provide one or more digital values to EC 190. In another instance, EC 190 may receive the one or more digital values from ADC 410. In one or more embodiments, information from an ADC 410 may be utilized in determining an impedance for a coupling 320. In one example, an impedance for a coupling 320 may be or include a real impedance. In another example, an impedance for a coupling 320 may be or include a reactive impedance. In one or more embodiments, an impedance for a coupling 320 may be or include a magnitude and a phase.

In one or more embodiments, if a probe lead 350 is coupled to a coupling 320, an impedance of coupling 320 may change. For example, an impedance of coupling 320 may change from a baseline impedance to another impedance. For instance, a baseline reactance of coupling 320 may change to another reactance. In one or more embodiments, a probe lead 350 coupled to a coupling 320 may increase a capacitance of coupling 320. For example, an impedance of coupling 320 may change from a baseline impedance to another impedance based at least on capacitance from probe lead 350. For instance, a baseline reactance of coupling 320 may change to another reactance based on an increased capacitance from probe lead 350. In one or more embodiments, EC 190 may determine a change in impedance of a coupling 320. For example, EC 190 may utilize an ADC 410, coupled to coupling 320, to determine a change in impedance of coupling 320. For instance, if a probe lead 350 is coupled to coupling 320, probe lead 350 may increase a determined and/measured capacitance of coupling 320.

Figure 4B:
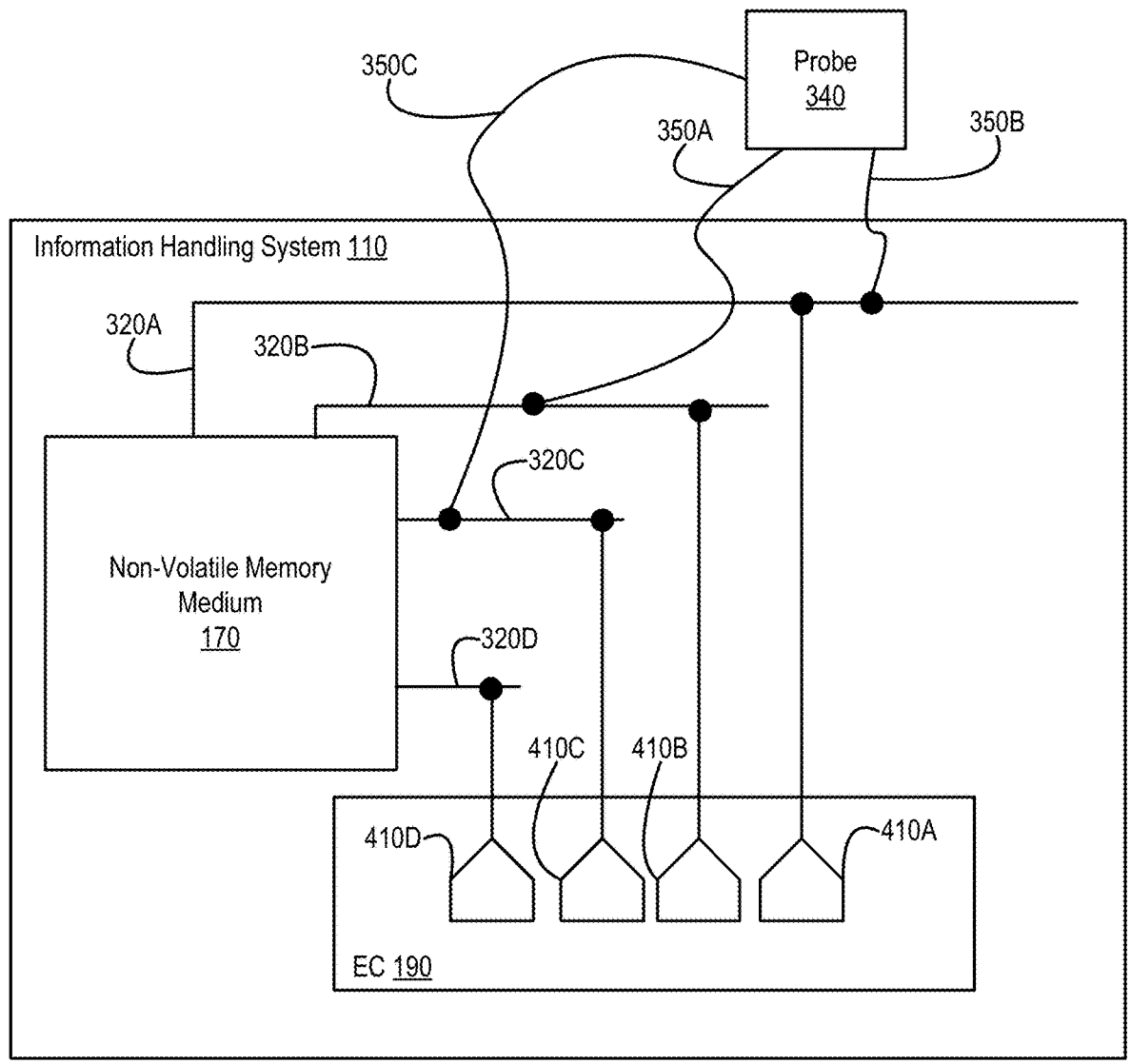
FIG. 4B illustrates a fourth example of a probe coupled to couplings of a component of an information handling system, according to one or more embodiments.

Turning now to FIG. 4B, a fourth example of a probe coupled to couplings of a component of an information handling system is illustrated, according to one or more embodiments. As shown, EC 190 may include ADCs 410A-410D.

Figure 5A:
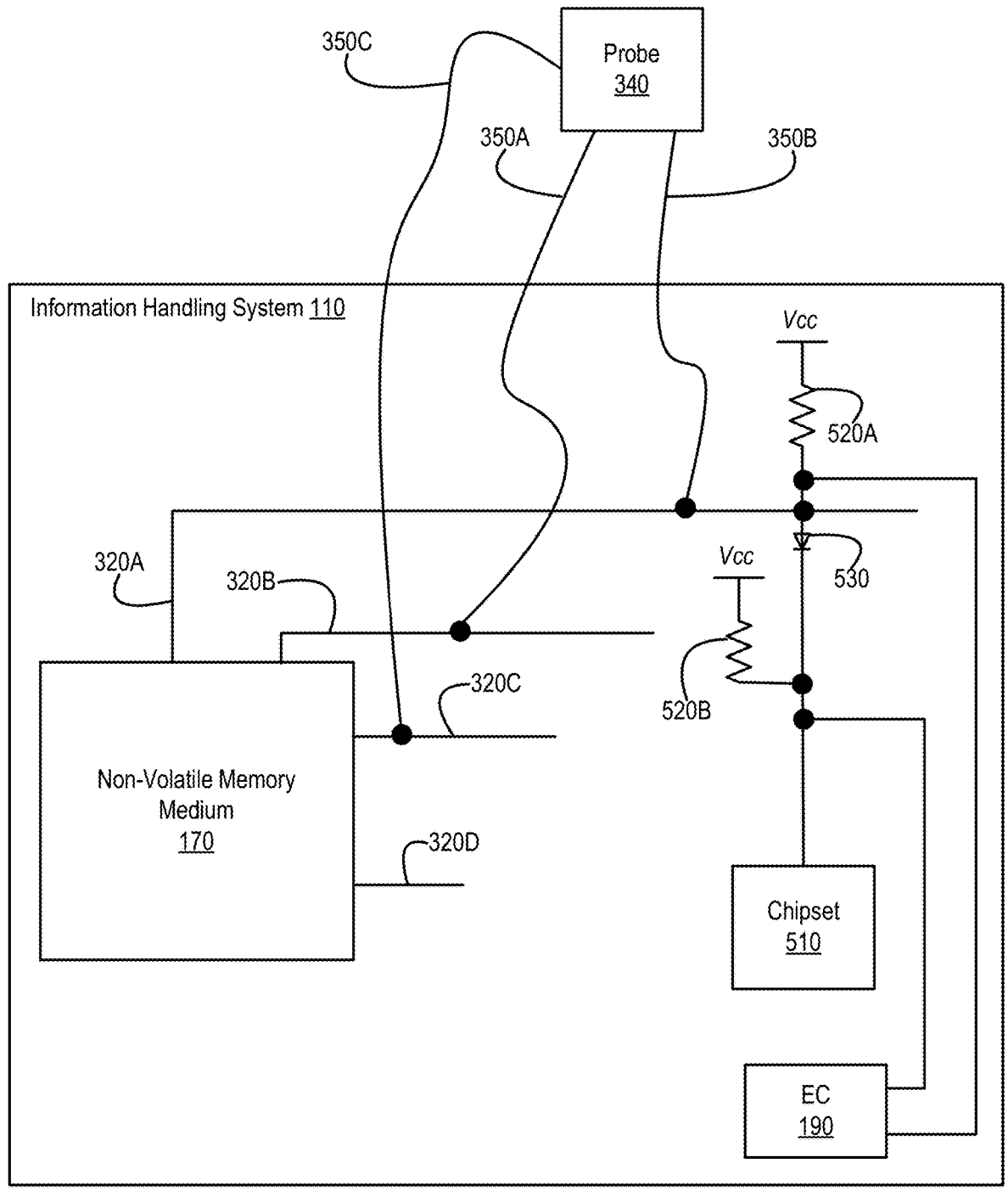
FIG. 5A illustrates a fifth example of a probe coupled to couplings of a component of an information handling system, according to one or more embodiments.

Turning now to FIG. 5A, a fifth example of a probe coupled to couplings of a component of an information handling system is illustrated, according to one or more embodiments. As shown, IHS 110 may include a chipset 510. For example, chipset 510 may include processor 120. As illustrated, chipset 510 may be coupled to coupling 320A. In one example, chipset 510 may provide a clock signal to coupling 320A. In a second example, chipset 510 may provide a chip select signal to coupling 320A. In a third example, chipset 510 may receive data from coupling 320A. In another example, chipset 510 may provide data to coupling 320A. As shown, EC 190 may be coupled to coupling 320A. As illustrated, a resistor 520A may be coupled to coupling 320A. For example, resistor 520A may be or include a pull-up resistor. As shown, a resistor 520B may be coupled to chipset 510. As illustrated, resistor 520B may be coupled to EC 190. For example, resistor 520B may be or include a pull-up resistor.

As illustrated, a diode 530 may be coupled to coupling 320A. As shown, diode 530 may be coupled to chipset 510. As illustrated, EC 190 may be coupled to both sides of diode 530. In one or more embodiments, EC 190 may determine a voltage drop across diode 530. For example, EC 190 may monitor multiple voltage drops across diode 530 by determining multiple voltage drops across diode 530 at multiple different times. For instance, the multiple different times may be or include multiple periodic times. In one or more embodiments, EC 190 may determine that probe coupling 350A is providing a clock signal. For example, EC 190 may determine a presence of a clock signal via coupling 320A and may determine no presence of a clock signal from chipset 510. In one or more embodiments, EC 190 may determine that probe coupling 350A is providing a chip select signal. For example, EC 190 may determine a presence of a chip select signal via coupling 320A and may determine no presence of a chip select signal from chipset 510.

Figure 5B:
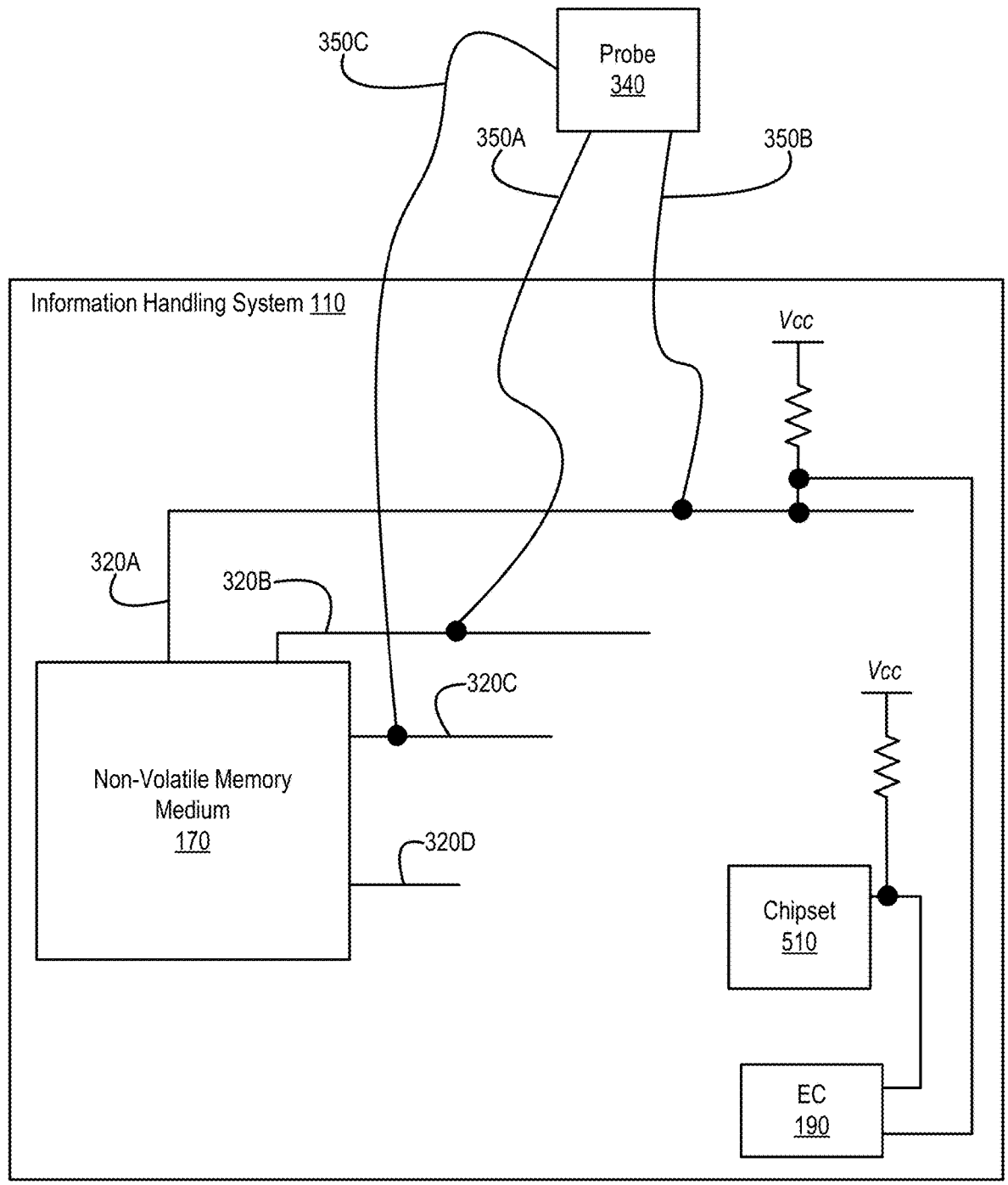
FIG. 5B illustrates another example of a probe coupled to couplings of a component of an information handling system, according to one or more embodiments.

Turning now to FIG. 5B, another example of a probe coupled to couplings of a component of an information handling system is illustrated, according to one or more embodiments. As shown, chipset 510 may be coupled to EC 190. In one or more embodiments, chipset 510 may provide a first clock signal to EC 190. For example, EC 190 may provide a second clock signal to coupling 520A. For instance, the second clock signal may be based at least on the first clock signal. In one or more embodiments, EC 190 may determine one or more changes of the second clock signal. For example, if an impedance of coupling 520A changes, the second clock signal may change. For instance, probe coupling 350A may change an impedance of coupling 520A, which may cause a change in the second clock signal. In one or more embodiments, EC 190 may determine that a third clock signal is present via coupling 520A. For example, EC 190 may determine that probe coupling 350A is providing the third clock signal. If EC 190 determines that the third clock signal is present via coupling 520A, EC 190 may ground one or more of couplings 320A-320D, according to one or more embodiments.

In one or more embodiments, chipset 510 may provide a first chip select chip select signal to EC 190. For example, EC 190 may provide a second chip select signal to coupling 520A. For instance, the second chip select signal may be based at least on the first chip select signal. In one or more embodiments, EC 190 may determine one or more changes of the second chip select signal. For example, if an impedance of coupling 520A changes, the second chip select signal may change. For instance, probe coupling 350A may change an impedance of coupling 520A, which may cause a change in the second chip select signal. In one or more embodiments, EC 190 may determine that a third chip select signal is present via coupling 520A. For example, EC 190 may determine that probe coupling 350A is providing the chip select signal. If EC 190 determines that the third chip select signal is present via coupling 520A, EC 190 may ground one or more of couplings 320A-320D, according to one or more embodiments.

In one or more embodiments, chipset 510 may provide a first data signal to EC 190. For example, EC 190 may provide a second data signal to coupling 520A. For instance, the second data signal may be based at least on the first data signal. In one or more embodiments, EC 190 may determine one or more changes of the second data signal. For example, if an impedance of coupling 520A changes, the second data signal may change. For instance, probe coupling 350A may change an impedance of coupling 520A, which may cause a change in the second data signal. In one or more embodiments, EC 190 may determine that a third data signal is present via coupling 520A. For example, EC 190 may determine that probe coupling 350A is providing the data signal. If EC 190 determines that the third data signal is present via coupling 520A, EC 190 may ground one or more of couplings 320A-320D, according to one or more embodiments.

Figure 6:
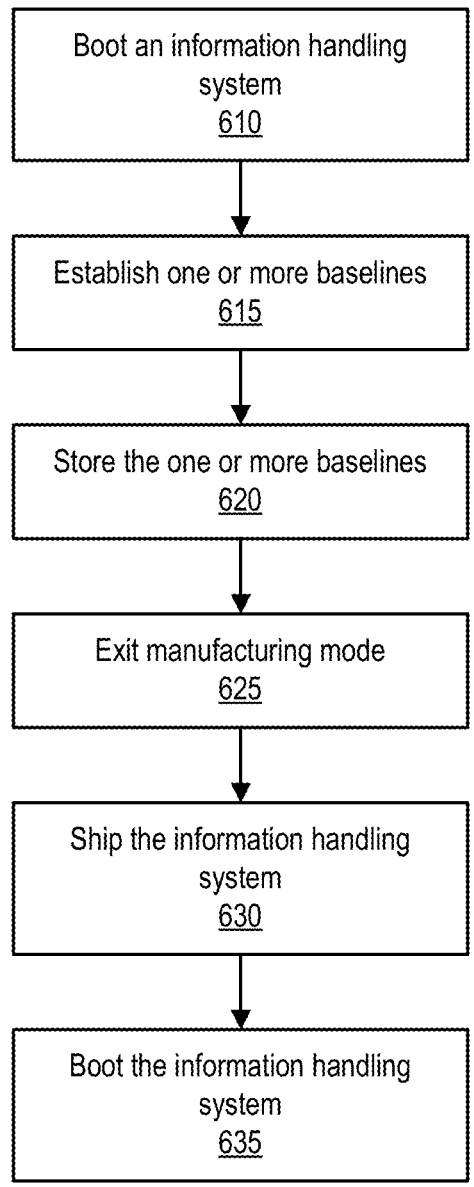
FIG. 6 illustrates an example method of operating an information handling system is illustrated, according to one or more embodiments.

Turning now to FIG. 6, an example method of operating an information handling system is illustrated, according to one or more embodiments. At 610, an information handling system may be booted. For example, IHS 110 may be booted for a first time. For instance, IHS 110 may be booted for a first time at a manufacturing facility of information handling systems.

At 615, one or more baselines may be established. In one or more embodiments, establishing one or more baselines may include determining one or more impedances of one or more couplings. For example, one or more baselines impedances of one or more of couplings 320A-320D, among others, may be determined and/or established. For instance, EC 190 may determine and/or may establish one or more baselines impedances of one or more of couplings 320A-320D, among others. In one or more embodiments, establishing one or more baselines may include learning one or more impedances of one or more couplings. For example, learning the one or more baselines may include utilizing one or more statistical methods and/or one or more statistical processes to establish one or more impedances of one or more couplings. In one or more embodiments, establishing a baseline impedance may include an analog to digital converter obtaining multiple samples of a signal conveyed via a coupling of a memory medium of an information handling system. For example, ADC 410 may obtain multiple samples of a signal conveyed via coupling 320. In one instance, the signal conveyed via coupling 320 may be or include a clock signal. In a second instance, the signal conveyed via coupling 320 may be or include a data signal.

At 620, the one or more baselines may be stored. For example, EC 190 may store the one or more baselines via a memory medium. For instance, EC 190 may store the one or more baselines via non-volatile memory medium 270. In one or more embodiments, EC 190 may configure EC data 277 with and/or configure EC data 277 to include the one or more baselines. For example, EC data 277 may store the one or more baselines. At 625, a manufacturing mode may be exited. In one example, IHS 110 may be placed into a manufacturing mode when IHS 110 first boots. In another example, IHS 110 may be placed into a manufacturing mode before IHS 110 first boots.

At 630, the information handling system may be shipped. In one example, IHS 110 may be shipped to a warehouse. In a second example, IHS 110 may be shipped to a commercial vendor of information handling systems. In another example, IHS 110 may be shipped to an end user. At 635, the information handling system may be booted. For example, IHS 110 may be booted by an end user.

Figure 7:
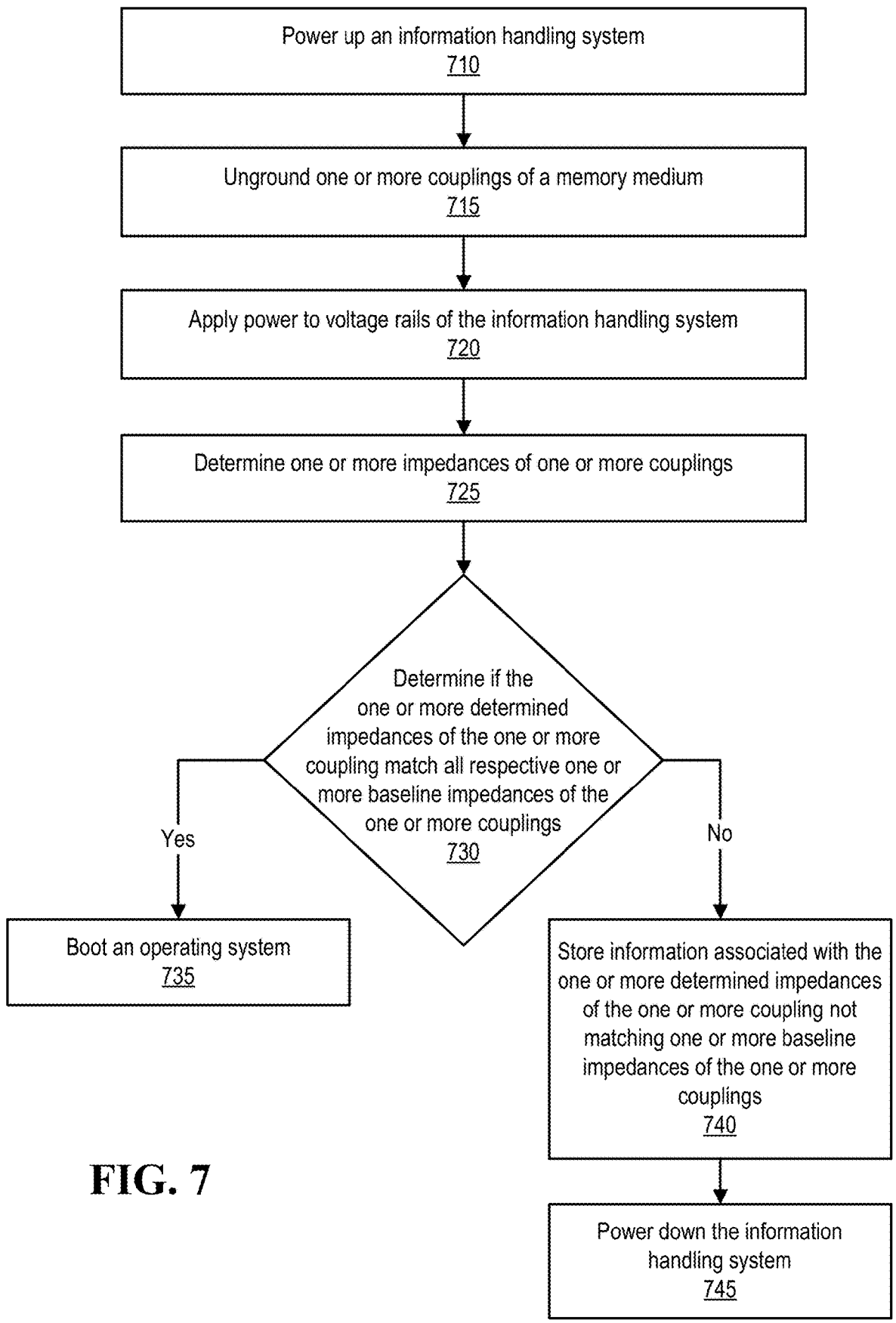
FIG. 7 illustrates a second example of a method of operating an information handling system, according to one or more embodiments.

Turning now to FIG. 7, a second example of a method of operating an information handling system is illustrated, according to one or more embodiments. At 710, an information handling system may be powered up. For example, IHS 110 may be powered up. For instance, EC 190 may power up IHS 110. At 715, one or more couplings of a memory medium may be ungrounded. For example, one or more of couplings 320A-320D may be ungrounded. For instance, switch 310 may have grounded one or more of couplings 320A-320D, and switch 310 may unground one or more of couplings 320A-320D. In one or more embodiments, EC 190 may provide a signal to switch 310 to unground one or more of couplings 320A-320D. In one or more embodiments, EC 190 may have grounded one or more of couplings 320A-320D, and EC 190 may unground one or more of couplings 320A-320D.

At 720, power may be applied to voltage rails of the information handling system. For example, power may be applied to voltage rails of IHS 110. For instance, EC 190 may control applying power to the voltage rails of IHS 110. At 725, one or more impedances of one or more couplings may be determined. For example, one or more impedances of one or more couplings 320A-320D may be determined. For instance, EC 190 may determine one or more impedances of one or more couplings 320A-320D. In one or more embodiments, EC 190 may utilize one or more ADCs in determining one or more impedances of one or more couplings 320A-320D.

At 730, it may be determined if the one or more determined impedances of the one or more couplings match all respective one or more baselines impedances of the one or more couplings. For example, it may be determined if the one or more determined impedances of the one or more couplings 320A-320D match one or more baselines impedances of the one or more couplings 320A-320D. For instance, EC 190 may determine if the one or more determined impedances of the one or more couplings 320A-320D match one or more baselines impedances of the one or more couplings 320A-320D. In one or more embodiments, determining if the one or more determined impedances of the one or more couplings match one or more baselines impedances of the one or more couplings may include determining if the one or more determined impedances of the one or more couplings match one or more baselines impedances of the one or more couplings within one or more tolerances and/or within one or more ranges. In one example, it may be determined that the one or more determined impedances of the one or more couplings match one or more baselines impedances of the one or more couplings if the one or more determined impedances of the one or more couplings are within one or more tolerances and/or are within one or more ranges of the one or more baselines impedances of the one or more couplings. In another example, it may be determined that the one or more determined impedances of the one or more couplings do not match one or more baselines impedances of the one or more couplings if the one or more determined impedances of the one or more couplings are not within one or more tolerances and/or are not within one or more ranges of the one or more baselines impedances of the one or more couplings.

If the one or more determined impedances of the one or more couplings match the one or more baselines impedances of the one or more couplings, an operating system may be booted, at 735. For example, OS 162 may be booted. If the one or more determined impedances of the one or more couplings do not match the one or more baselines impedances of the one or more couplings, information associated with the one or more determined impedances of the one or more couplings not matching the one or more baselines impedances of the one or more couplings may be stored, at 740. For example, EC 190 may store information associated with the one or more determined impedances of the one or more couplings not matching the one or more baselines impedances of the one or more couplings. For instance, EC 190 may store the information via non-volatile memory medium 270. In one or more embodiments, EC 190 may configure EC data 277 to store and/or include the information associated with the one or more determined impedances of the one or more couplings not matching the one or more baselines impedances of the one or more couplings. At 745, the information handling system may be powered down. For example, IHS 110 may be powered down. For instance, EC 190 may power down IHS 110.

Figure 8:
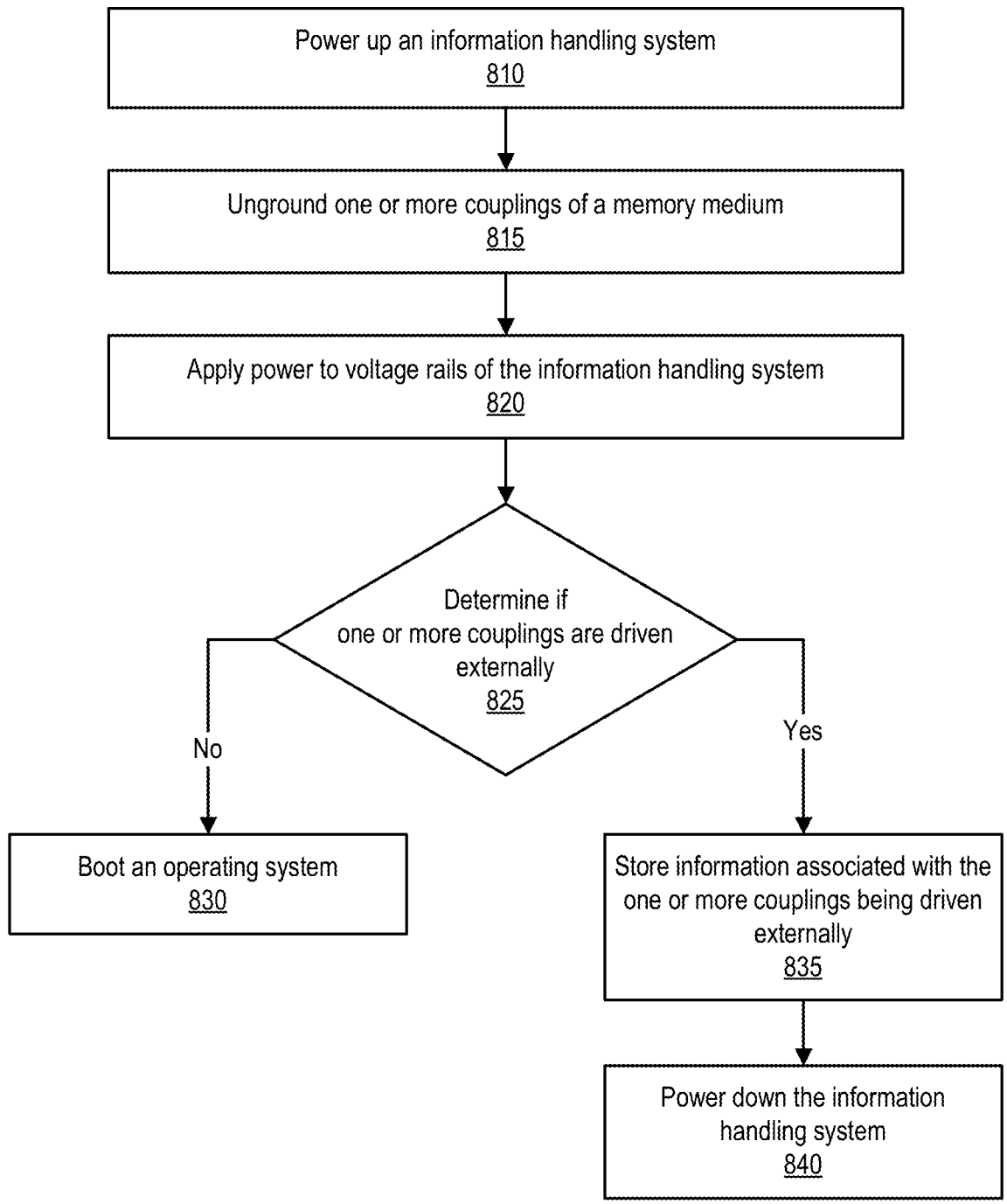
FIG. 8 illustrates a third example of a method of operating an information handling system, according to one or more embodiments.

Turning now to FIG. 8, a third example of a method of operating an information handling system is illustrated, according to one or more embodiments. In one or more embodiments, method elements 810-820, 830, and 840 may be performed in accordance with method elements 710-720, 735, and 745, respectively, of FIG. 7. At 825, it may be determined if one or more couplings are being driven externally. For example, probe 340 may drive coupling 320A, via coupling 350A. For instance, probe 340 may considered external to IHS 110.

If one or more couplings are not being driven externally, the method may proceed to 830. If one or more couplings are being driven externally, information associated with the one or more couplings being driven externally may be stored. For example, EC 190 may store information associated with the one or more couplings being driven externally. For instance, EC 190 may store the information via non-volatile memory medium 270. In one or more embodiments, EC 190 may configure EC data 277 to store and/or include the information associated with the one or more couplings being driven externally.

Figure 9:
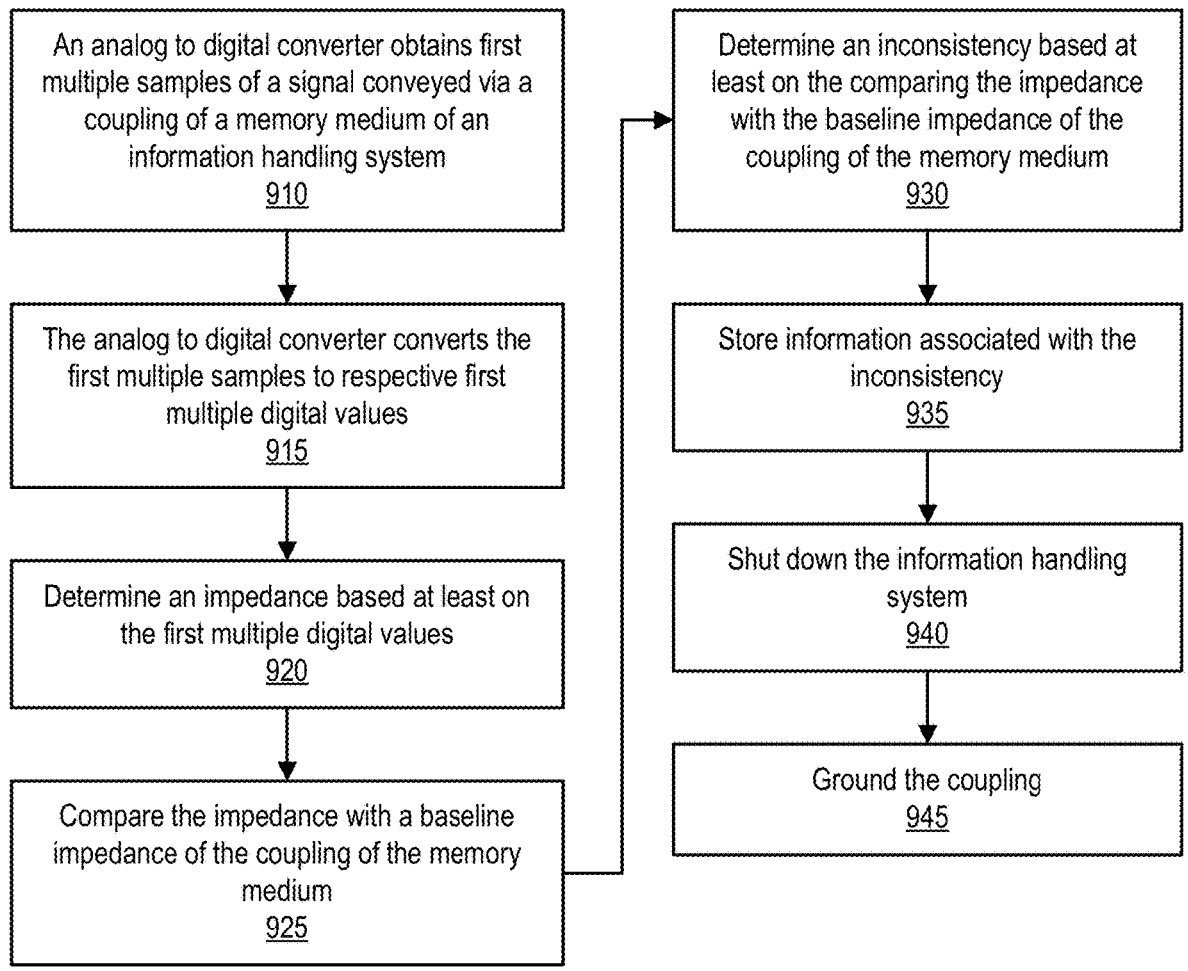
FIG. 9 illustrates another example of a method of operating an information handling system is illustrated, according to one or more embodiments.

Turning now to FIG. 9, another example of a method of operating an information handling system is illustrated, according to one or more embodiments. At 910, an analog to digital converter may obtain first multiple samples of a signal conveyed via a coupling of a memory medium of an information handling system. For example, an ADC 410 may obtain first multiple samples of a signal conveyed via a coupling 320. In one instance, the signal conveyed via coupling 320 may include a signal from chipset 510 or EC 190. In another instance, the signal conveyed via coupling 320 may include a signal from probe 340. In one or more embodiments, the signal conveyed via coupling 320 may be a digital signal. In one or more embodiments, the signal conveyed via coupling 320 may be an analog signal that may include the digital signal. In one or more embodiments, the signal conveyed via coupling 320 may be an analog signal that may represent the digital signal. In one or more embodiments, the first multiple samples of the signal conveyed via the coupling may include multiple voltage samples. In one or more embodiments, the first multiple samples of the signal conveyed via the coupling may include multiple current (e.g., Coulombs per second) samples.

At 915, the analog to digital converter may convert the multiple samples to respective first multiple digital values. For example, ADC 410 may convert the multiple samples to respective first multiple digital values. In one or more embodiments, the first multiple digital values may be or include respective multiple numbers. At 920, an impedance based at least on the first multiple digital values may be determined. For example, EC 190 may determine an impedance based at least on the first multiple digital values. For instance, the first multiple digital values may be or include respective first numbers.

At 925, the impedance may be compared with a baseline impedance of the coupling of the memory medium. For example, EC 190 may compare the impedance of coupling 320 with a baseline impedance of coupling 320. In one or more embodiments, EC 190 may retrieve the baseline impedance of coupling 320 from non-volatile memory medium 270. For example, EC 190 may retrieve the baseline impedance of coupling 320 from EC data 277. At 930, an inconsistency based at least on comparing the impedance with the baseline impedance of the coupling of the memory medium may be determined. For example, EC 190 may determine an inconsistency based at least on comparing the impedance of coupling 320 with the baseline impedance of coupling 320. In one or more embodiments, determining the inconsistency may include determining that the impedance does not match the baseline impedance. For example, determining the inconsistency may include determining that the impedance does not match the baseline impedance within a tolerance and/or within a range.

At 935, information associated with the inconsistency may be stored. For example, EC 190 may store information associated with the inconsistency. For instance, EC 190 may store the information via non-volatile memory medium 270. In one or more embodiments, EC 190 may configure EC data 277 to store and/or include the information associated with inconsistency. In one or more embodiments, the information associated with the inconsistency may include information associated with a possible intrusion or associated with an actual intrusion.

At 940, the information handling system may be shut down. For example, EC 190 may shut down IHS 110. In one or more embodiments, the information handling system may be shut down in response to determining the inconsistency. At 945, the coupling of the memory medium may be grounded. For example, EC 190 may ground the coupling. In one instance, EC 190 control switch 310 to ground coupling 320. In another instance, EC 190 may ground the coupling via one or more semiconductors. In one or more embodiments, the coupling of the memory medium may be grounded in response to determining the inconsistency. In one or more embodiments, grounding the coupling may include grounding other couplings of the memory medium. For example, grounding the other couplings of the memory medium may be performed in response to determining the inconsistency.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments. In one or more embodiments, identifications of first, second, third, etc. may be utilized as enumerations. For example, the enumerations may not necessarily imply any ordering.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a memory medium, coupled to a plurality of couplings;
an analog to digital converter, coupled to a coupling of the plurality of couplings; and
an embedded controller;
wherein the analog to digital converter is configured to:
   obtain a first plurality of samples of a first signal conveyed via the coupling of the plurality of couplings; and
   convert the first plurality of samples to a respective first plurality of digital values; and
wherein the embedded controller is configured to:
   determine an impedance based at least on the first plurality of digital values;
   compare the impedance with a baseline impedance of the coupling of the memory medium;
   determine an inconsistency based at least on comparing the impedance with the baseline impedance of the coupling of the memory medium; and
   in response to determining the inconsistency, shut down the information handling system.

2. The information handling system of claim 1,
wherein the impedance of the coupling of the memory medium includes a first reactive impedance;
wherein the baseline impedance of the coupling of the memory medium includes a second reactive impedance; and
wherein, to determine the inconsistency, the embedded controller is further configured to determine that the first reactive impedance does not match the second reactive impedance.

3. The information handling system of claim 1, wherein the first plurality of samples includes a plurality of voltage samples.

4. The information handling system of claim 1, wherein the embedded controller is further configured to establish the baseline impedance of the coupling of the memory medium.

5. The information handling system of claim 4,
wherein the analog to digital converter is further configured to:
obtain a second plurality of samples of a second signal conveyed via the coupling; and
convert the second plurality of samples to a respective second plurality of digital values; and
wherein, to establish the baseline impedance of the coupling of the memory medium, the embedded controller is further configured to determine the baseline impedance based at least on the second plurality of digital values.

6. The information handling system of claim 1, wherein the embedded controller includes the analog to digital converter.

7. The information handling system of claim 1, wherein the embedded controller is further configured to:
in response to determining the inconsistency, ground the coupling of the memory medium.

8. A method, comprising:
an analog to digital converter obtaining a first plurality of samples of a first signal conveyed via a coupling of a memory medium of an information handling system;
the analog to digital converter converting the first plurality of samples to a respective first plurality of digital values;
determining an impedance based at least on the first plurality of digital values;
comparing the impedance with a baseline impedance of the coupling of the memory medium;
determining an inconsistency based at least on the comparing the impedance with the baseline impedance of the coupling of the memory medium; and
in response to the determining the inconsistency, shutting down the information handling system.

9. The method of claim 8,
wherein the impedance of the coupling of the memory medium includes a first reactive impedance;
wherein the baseline impedance of the coupling of the memory medium includes a second reactive impedance; and
wherein the determining the inconsistency includes determining that the first reactive impedance does not match the second reactive impedance.

10. The method of claim 8, wherein the first plurality of samples includes a plurality of voltage samples.

11. The method of claim 8, further comprising:
establishing the baseline impedance of the coupling of the memory medium.

12. The method of claim 11, wherein the establishing the baseline impedance of the coupling of the memory medium includes:
the analog to digital converter obtaining a second plurality of samples of a second signal conveyed via the coupling;
the analog to digital converter converting the second plurality of samples to a respective second plurality of digital values; and
determining the baseline impedance based at least on the second plurality of digital values.

13. The method of claim 8, wherein an embedded controller of the information handling system includes the analog to digital converter.

14. The method of claim 8, further comprising:
in response to the determining the inconsistency, grounding the coupling of the memory medium.

15. An embedded controller, configured to:
receive a first plurality of digital values via an analog to digital converter that is configured to obtain a first plurality of samples of a first signal conveyed via a coupling of a memory medium of an information handling system and convert the first plurality of samples to the first plurality of digital values, respectively;
determine an impedance based at least on the first plurality of digital values;
compare the impedance with a baseline impedance of the coupling of the memory medium;
determine an inconsistency based at least on comparing the impedance with the baseline impedance of the coupling of the memory medium; and
in response to determining the inconsistency, shut down the information handling system.

16. The embedded controller of claim 15,
wherein the impedance of the coupling of the memory medium includes a first reactive impedance;
wherein the baseline impedance of the coupling of the memory medium includes a second reactive impedance; and
wherein, to determine the inconsistency, the embedded controller is further configured to determine that the first reactive impedance does not match the second reactive impedance.

17. The embedded controller of claim 15, wherein the first plurality of samples includes a plurality of voltage samples.

18. The embedded controller of claim 15, wherein the embedded controller is further configured to establish the baseline impedance of the coupling of the memory medium.

19. The embedded controller of claim 15, wherein the embedded controller includes the analog to digital converter.

20. The embedded controller of claim 15, wherein the embedded controller is further configured to:
in response to determining the inconsistency, ground the coupling of the memory medium.

* * * * *